3,562,010
PROCESS FOR PURIFYING A METAL LAYER PRECIPITATED CATALYTICALLY ONTO A CARRIER OF GLASS, CERAMIC, METAL OR A HEAT-RESISTANT PLASTIC
Axel Emil Bergstrom, Fregattvagen 7, Lidingo, Sweden
No Drawing. Continuation-in-part of application Ser. No. 545,563, Apr. 27, 1966. This application Feb. 17, 1969, Ser. No. 799,937
Claims priority, application Sweden, Apr. 30, 1965, 5,715/65
Int. Cl. C03c *17/06;* B44d *1/18*
U.S. Cl. 117—227                                    5 Claims

ABSTRACT OF THE DISCLOSURE

A process for purifying nickel, chromium or cobalt layers precipitated catalytically in the presence of hypophosphite onto a carrier of glass, ceramic, metal or heat-resistant plastic materials, such as fluorocarbon plastics or silicon plastics, wherein the metal layer is treated at a temperature of between 330° and 420° C. with hydrogen gas, for a length of time sufficient to increase considerably the electrical conductivity of the layer.

---

This application is a continuation-in-part of application Ser. No. 545,563, filed Apr. 27, 1966 now abandoned.

The present invention relates to a process for purifying a nickel, chromium or cobalt layer, precipitated catalytically onto a carrier of glass, ceramic, metal and heat-resistant plastics, such as fluorocarbon plastics, silicon plastics and the like, by treating the layer with hydrogen gas at a temperature of 330–420° C. for a sufficient length of time to remove inclusions of phosphides and/or hydroxide formed during the catalytic precipitation process. The electrical conductivity of such a layer is greatly improved when purifying the layer in accordance with the present invention.

It is well known in the art to coat a carrier catalytically with a layer of metal. When precipitating a coating layer in the absence of an electric current, the carrier is normally treated with an activating substance, usually tin-(II)-chloride, whereafter a thin layer of a catalyzing metal is precipitated onto the activated surface of the carrier. This metal may itself constitute the catalytically precipitated layer, although it is normal to use metals particularly suitable for the purpose, such as palladium, gold or mixtures thereof. The catalytic layer is precipitated onto the carrier by simply immersing the carrier in a salt of the catalyst metal or metals. Subsequent to forming the catalytic layer, the carrier is immersed in a salt solution of the metal to be precipitated catalytically onto the surface of the carrier. When the layer has reached the desired thickness, the coated carrier is removed and washed.

Particularly when precipitating such metals as nickel, chromium and cobalt, the precipitation bath, in addition to containing a soluble salt of the metal precipitate, also contains appropriate reducing agents and buffer substances. Reducing agents normally used are sodium hydrophosphite ($NaH_2PO_2$) or hydrophosphorous acid, while the buffer is usually an acetate, citrate or borate. When precipitating metallic coatings in the manner described above, metal phosphides and metal hydroxides are precipitated together with the metal precipitate and become enclosed within the coating, the quantities in which the phosphides and hydroxides are precipitated being dependent on the pH of the bath. The ratio of phosphides to hydroxides varies, and the phosphides predominate over the hydroxides at low pH values, while the reverse is true at high pH values.

It is known to treat precipitated metal catalysts at elevated temperatures with a reducing gas, for instance hydrogen, but since the object of these methods is to produce a more active catalyst they do not concern the present object, and therefore will not be discussed in detail.

It has now surprisingly been found possible to purify thin layers of nickel, chromium and cobalt, which have been precipitated catalytically in the presence of hydrophosphite, from inclusions of phosphides and hydroxides of said metals. As previously mentioned, the electrical conductivity of a coating layer cleansed of these compounds is greatly improved, which imparts to the coated surface a much higher reflection coefficient, especially with regard to infrared radiation.

The precipitated metal layer is cleansed by treating it with hydrogen gas, optionally mixed with an inert gas, at a temperature of from 330 to 420° C. It is important to the process that the hydrogen gas used be free of all impurities; acetylene and carbon dioxide, for instance, have been found particularly deleterious to the process. Neither is it possible to use carbon monoxide as the reducing gas.

The course of the process can be followed by observing the changes in the electrical conductivity of the coated article which occur during said process. The conductivity of the carrier when processed according to the invention is improved to some extent already at 300° C. However, a marked increase in conductivity is first manifested at 330° C., and appears to reach a maximum increase at 400° C. The upper limit of the temperature range has been set at 420° C. since one of the most preferred carriers, namely glass, begins to soften in the vicinity of this temperature and because no reason has been found to use higher temperatures when treating carriers made of other materials. When the material of the carrier is one which is sensitive to temperature, it is possible to lower the temperature to 330° C., which, however, only restricts the choice of plastic material to the most temperature-resistant species, such as fluorocarbon plastics and silicon plastics.

As mentioned, when precipitating catalytically in the presence of hypophosphite, phosphides are formed, of which $Me_2P$ and $Me_3P_2$ would appear to be the main products. Under the influence of hydrogen at the stipulated temperatures, the phosphorus is hydrated to $H_3P$ and expelled, at the same time as the metal is reduced.

The hydroxides are also decomposed by hydrogen at a temperature of about 400° C. Nickel forms phosphides when precipitated, to a greater extent than does cobalt and chromium.

The conductivity of the precipitated layer when treated in accordance with the invention is often increased by several factors of ten. As is known, an increase in electric conductivity leads to an increase in reflection of radiation in the infrared portion of the spectrum. This is shown by the known equation $$K_r = 1 - K\left(\frac{\mu}{\sigma\lambda}\right)^{1/2}$$

where $K_r$ is the reflection ability of a specific wave length $\lambda$ in the infrared region, K is a natural constant, $\mu$ is the permeability of the surface, and $\sigma$ is the conductivity.

The invention has been found extremely useful when treating optically acting metal filters on transparent surfaces. Window glass treated to reflect unwanted radiation from the sun is an example of this.

What is claimed is:
1. A process for purifying nickel, chromium or cobalt layers precipitated catalytically in the presence of hypophosphite onto a carrier of glass, ceramic, metal or heat resistant plastic materials, which comprises treating the metal layer at a temperature of between 330° and 420° C. with hydrogen gas, for a length of time sufficient to increase considerably the electrical conductivity of the layer.

2. The process of claim 1, wherein the hydrogen gas is mixed with an inert gas.

3. The process of claim 1 wherein the hydrogen gas is substantially free of acetylene and carbon dioxide.

4. A process of claim 2 wherein the hydrogen gas is substantially free of acetylene and carbon dioxide.

5. The process of claim 1 wherein the carrier is a fluorocarbon or silicon plastic.

References Cited
FOREIGN PATENTS 1,343,139   10/1963   France _____ 117—130

OTHER REFERENCES

Brenner et al.: Plating, vol. 37, January 1950, 117—130, TS/670, A3, pages 36–42.

Domnikov: Metal Finishing, January 1963, 117—130, pages 78 and 79.

WILLIAM L. JARVIS, Primary Examiner

U.S. Cl. X.R.

117—62, 130